United States Patent

[11] 3,624,239

[72] Inventor Arthur P. Fraas
 Knoxville, Tenn.
[21] Appl. No. 10,516
[22] Filed Feb. 11, 1970
[45] Patented Nov. 30, 1971
[73] Assignee The United States of America as represented by the United States Atomic Energy Commission

[54] PULSED LASER-IGNITED THERMONUCLEAR REACTOR
 10 Claims, 5 Drawing Figs.
[52] U.S. Cl. .................................................. 176/1, 176/9, 60/DIG. 4, 60/36, 60/59 T, 176/39
[51] Int. Cl. ...................................................... G21b 1/00
[50] Field of Search ........................................... 176/1, 9

[56] References Cited
UNITED STATES PATENTS
3,113,082 12/1963 Imhoff ......................... 176/5
3,378,446 4/1968 Whittlesey ..................... 176/1

Primary Examiner—Reoben Epstein
Attorney—Roland A. Anderson

ABSTRACT: A thermonuclear reactor, for providing heat input to a power producing system or the like, wherein pellets, singly injected, of frozen thermonuclear fuel are ignited with a pulsed laser beam. Ignition takes place within a void in liquid lithium contained within a pressure vessel. The void in the liquid lithium is created by injecting the lithium tangentially into the pressure vessel, by spraying the lithium through jets, or a combination thereof. Introducing bubbles in the liquid decreases the shock wave forces at the pressure vessel wall. The lithium, which is heated by the thermonuclear reactions created within the void, is passed through a heat exchanger and tritium recovery system for heating a working fluid for the power producing system and for recovery of the tritium produced in the lithium by the reactions.

PATENTED NOV 30 1971

INVENTOR.
Arthur P. Fraas

BY

ATTORNEY.

INVENTOR.
Arthur P. Fraas

BY

ATTORNEY.

PULSED LASER-IGNITED THERMONUCLEAR REACTOR

BACKGROUND OF THE INVENTION

The invention described herein was made in the course of, or under, a contract with the U.S. Atomic Energy Commission.

It is known that the sun produces energy by thermonuclear reactions which proceed at exceedingly high temperatures. These reactions and all controlled thermonuclear reactions depend upon collisions between nuclei to liberate energy. It can be shown that extremely high temperatures must be reached to attain useful thermonuclear power, but at those temperatures the energy loss due to radiation is also great. Deuterium and tritium release energy at relatively low temperatures and emit relatively little radiation such that they are suitable thermonuclear fuels. Confinement of the fuel at such temperatures has been accomplished in the prior art by providing very strong magnetic fields encompassing the containment vessel for the fuel, and various schemes have been heretofore provided for increasing the density of the ions of the fuel and the energy thereof such that the ions will undergo fusion reactions to produce high energy neutrons. In prior art reactors operating with deuterium-tritium as the fuel, there is usually provided a blanket encompassing the reactor vessel for breeding tritium and for converting the kinetic energy of the fusion neutrons into recoverable heat which is utilized in a conventional heat cycle for producing electricity.

Such a blanket must satisfy three basic nuclear engineering requirements: (1) it must breed tritium; i.e., a tritium-based power economy is not feasible unless the rate of tritium production in the blanket exceeds its rate of consumption in the fusion plasma; (2) it must convert the kinetic energy of the fusion neutrons into recoverable heat as mentioned above; and (3) it must be stable against structural failure and corrosion at operating temperatures and under neutron irradiation.

Some of the problems that exist with prior art devices include the proper containment of the thermonuclear reaction products with very strong magnetic fields and the attendant high costs associated with providing such fields, the heating of the thermonuclear fuel to sufficiently high temperatures to insure that thermonuclear reactions will take place, the provision of means for insuring that the density of the heated fuel is sufficiently large as to overcome the various loss mechanisms associated with the production of high temperature plasma, and the fast neutron damage to the vacuum wall of the container in which the thermonuclear reactions take place.

The present invention was conceived to eliminate some of the above problems in a manner to be described hereinbelow.

SUMMARY OF THE INVENTION

It is the object of the present invention to provide a thermonuclear reactor which will eliminate the need for cryogenic magnetic fields normally used for plasma confinement, substantially eliminate fast neutron damage to the vacuum wall of the reactor, provide a tritium breeding ratio greater than one, and produce more electrical power than is consumed in the operation of the reactor.

The above object has been accomplished in the present invention by the use of pellets of frozen thermonuclear fuel, e.g., deuterium-tritium, which are periodically and singly injected into a central void of a circulating body of liquid lithium. The void in the liquid lithium is most conveniently created by injecting the lithium tangentially into a pressure vessel so as to create a central vortex. Each of the pellets is bombarded with an intense laser pulse when the pellet is essentially confined in the void of the liquid lithium to produce fusion and heat the lithium. The heated lithium is conveyed to a heat exchanger and tritium recovery system after which the lithium is conveyed back to the reactor pressure vessel. In order to adequately contain the shock wave forces at the reactor pressure vessel wall caused by the sequential ignition of each of the frozen pellets by the pulsed laser beam, it is preferable to inject gas bubbles into the lithium flow when it is being conveyed back into the pressure vessel from the heat exchanger. However, it should be understood that the reactor can be operated without the gas bubbles by providing the pressure vessel with thicker walls.

The liquid lithium with the gas bubbles surrounding the central void created within the pressure vessel serves not only as a tritium breeding blanket, but also as means for absorbing the shock wave forces of the periodic thermonuclear reactions created within the void and as a means for substantially reducing or eliminating fast neutron damage to the pressure vessel walls such that there is no need for providing magnetic fields outside the pressure vessel for plasma containment purposes.

DESCRIPTION OF THE PREFERRED EMBODIMENTS

Figure 1:
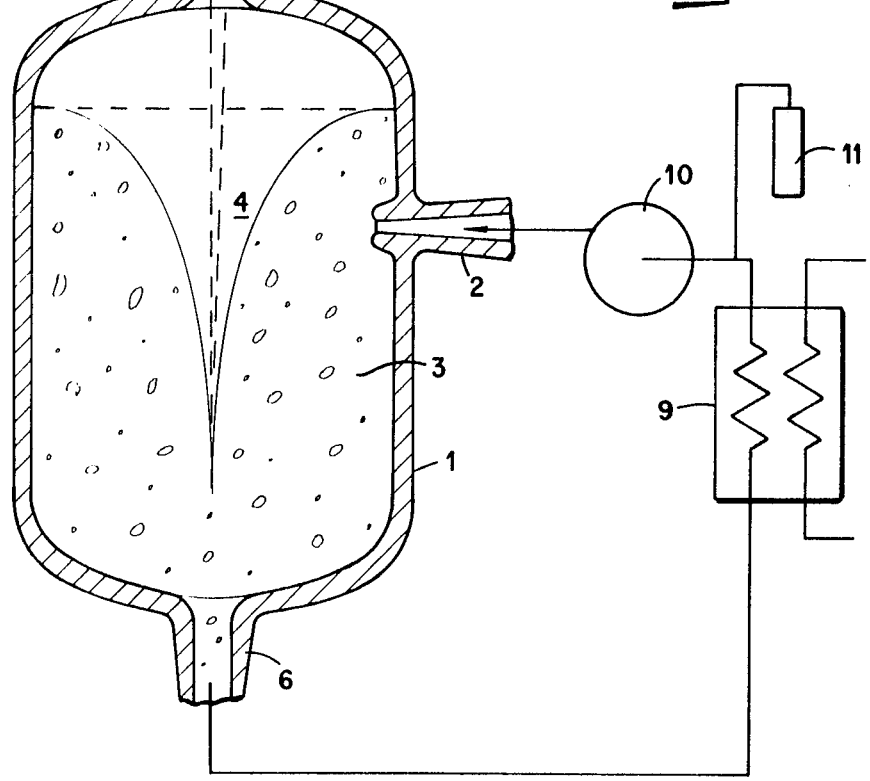
FIG. 1 is a drawing illustrating a basic design of the present invention.

Referring to FIG. 1, a pressure vessel 1 of circular cross section, which may be a sphere or cylinder, is provided with a tangential inlet 2 for the introduction of liquid lithium to create a wall of lithium 3 with a central vortex 4. In practice, several lithium inlets may be used to form a vortex of a given shape, e.g., constant diameter. A second inlet 5, for the injection of fuel pellets and a laser beam, and a lithium outlet 6 are axially aligned with the axis of the vortex 4. A fuel pellet feeding system 7 and a laser beam source 8 are aligned with the inlet 5, as shown.

Figure 5:
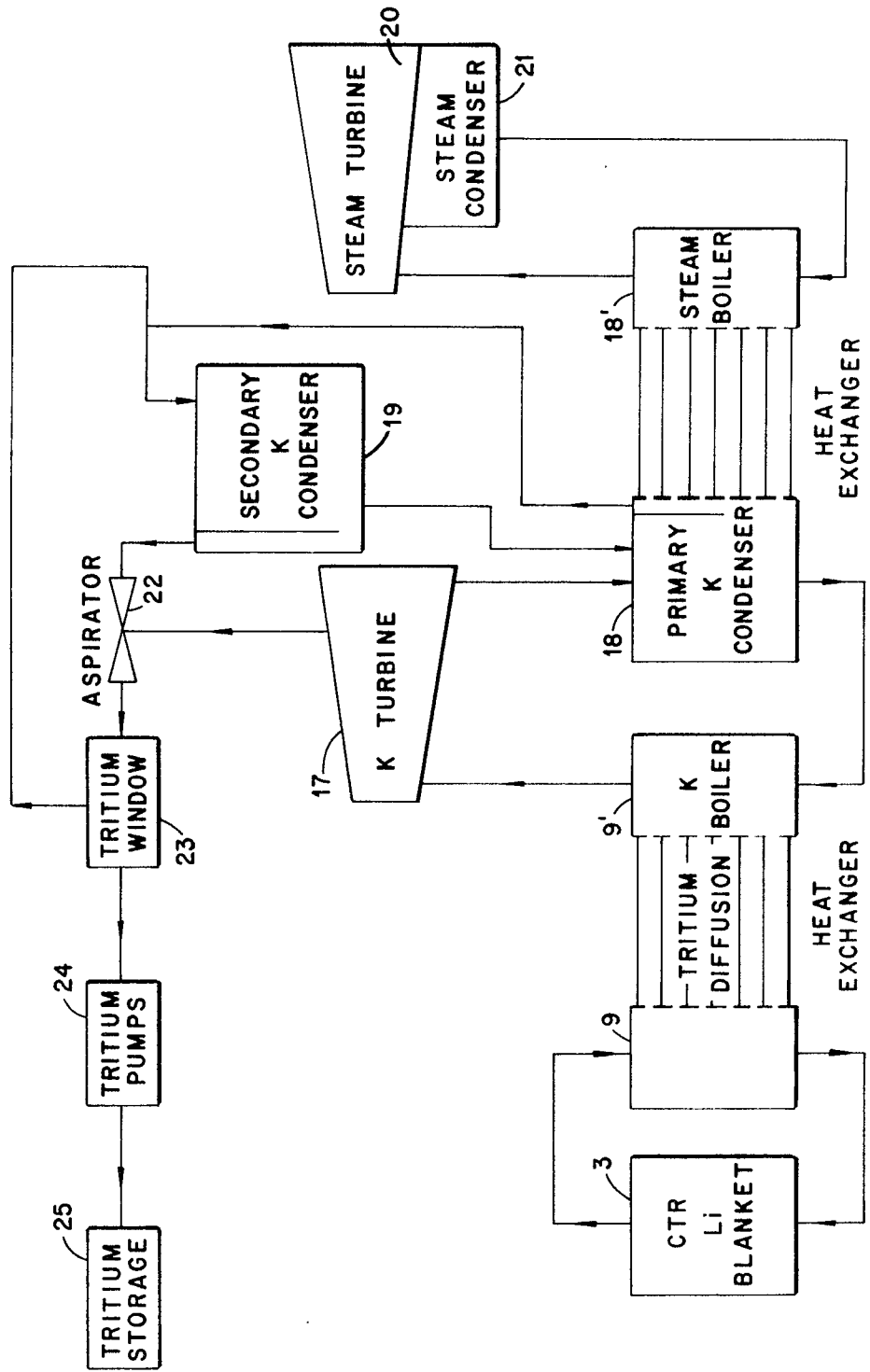
FIG. 5 is a block diagram of the heat exchanger and tritium recovery system that can be used with the devices of FIGS. 1–3.

The liquid lithium circuit is completed by connecting the outlet 6 to a heat exchanger 9, with the outlet therefrom connected to a pump 10 for feeding the lithium back into inlet 2. Since it is important to have gas bubbles in the liquid lithium 3, a source of inert gas 11 may be connected to the pump 10, to tangential nozzles in the pressure vessel, or to other convenient points in the system. The heat exchanger 9 and a tritium recovery system associated therewith are illustrated in FIG. 5, which will be described hereinbelow. In should be understood that the liquid lithium is heated at startup to a desired operating temperature by any convenient means, not shown, in a conventional manner.

The reactor vessel in FIG. 1 may be 12.5 feet in diameter with a wall thickness of 10 inches and constructed of a steel alloy or niobium, for example. Lithium is pumped at a rate of 1400 gallons per minute through the reactor vessel with sufficient gas added thereto to reduce the mean density thereof by about 5 percent. The operating temperature of the lithium is maintained from about 900° F. to 1800° F., for example, depending upon the material used in the pressure vessel.

In the operation of the system of FIG. 1, frozen D–T pellets of perhaps 0.1–0.2 inch diameter, for example, are injected singly to a position near the bottom of the vortex 4 at which time a pulsed laser beam, with a duration of less than $10^{-9}$ sec., is used to initiate fusion reactions in the pellet and vaporized gas therefrom. This pulsing (of pellet feeding and laser) is repeated at selected intervals from 1 to 30 seconds. The energy of the laser pulse may be of a selected value from $2\times10^3$ to $10^7$ Joules. The resultant energy release from the fusion reactions is about $10^4$ to $10^9$ Joules per pulse depending upon the specific energy of the input laser pulse, and this produces about a 100° F. rise in the lithium temperature corresponding to the production of 50 to 1000 Mw of thermal energy. The circulating lithium then transfers a portion of its heat in the heat exchanger 9. This heat may be used to boil a working fluid for a Rankine cycle system or to heat a gas for a Brayton cycle system.

It would be helpful to envision in detail the sequence of events in the course of one explosion cycle. The D-T pellet would be injected, perhaps 10 percent of the pellet would be vaporized as a consequence of absorption of heat radiated to it by the hot lithium as it moved along its trajectory, the remainder of the pellet would be vaporized, ionized, and heated when struck by the laser beam, some of the D-T ions would fuse, and the fusion energy released would beat the balance of the plasma so that much of it would fuse before plasma expansion terminated the reaction and a blast wave would be generated. About 75 percent of the energy from the fusion reaction would go into 14-mev neutrons, and this energy would be absorbed as these neutrons were slowed down in the inner region of the lithium (which would have an effective thickness of perhaps 60 cm.). About 25 percent of the energy released by the fusion reaction would appear as X-rays and alpha particles. The energy in these would be largely absorbed in the first 4 to 6 mm. of the lithium layer, the lithium in that thin layer would be vaporized, and this would induce a blast wave. The energy in the 14-mev neutrons will be absorbed in the liquid lithium and raise the temperature of the central region a few hundred degrees in a period of perhaps $10^{-6}$ sec. This will cause expansion of the lithium, but that expansion should be largely absorbed by contraction of the bubbles and, in any case, will yield a much weaker blast wave than that given by the X-rays and alpha particles.

The shock waves will move through the lithium at a velocity of about 15,000 ft./sec. The liquid will move outward from the explosion center at a lower velocity to form a spherical cavity. The liquid displaced will move into the upper portion of the vortex cavity. This will entail a good deal of liquid sloshing, particularly in the region of the port for the injection of the D-T pellet and the laser beam. However, the basic passage geometry of FIG. 4 designed to attenuate the blast wave moving up through the port should also be effective in inhibiting the sloshing of liquid up the port.

The rotational momentum in the lithium in the pressure vessel will help to reestablish the vortex. Further, the lithium throughflow in a typical case will be so large that about 50 percent of the lithium in the vessel would be replaced each cycle.

Figure 4:
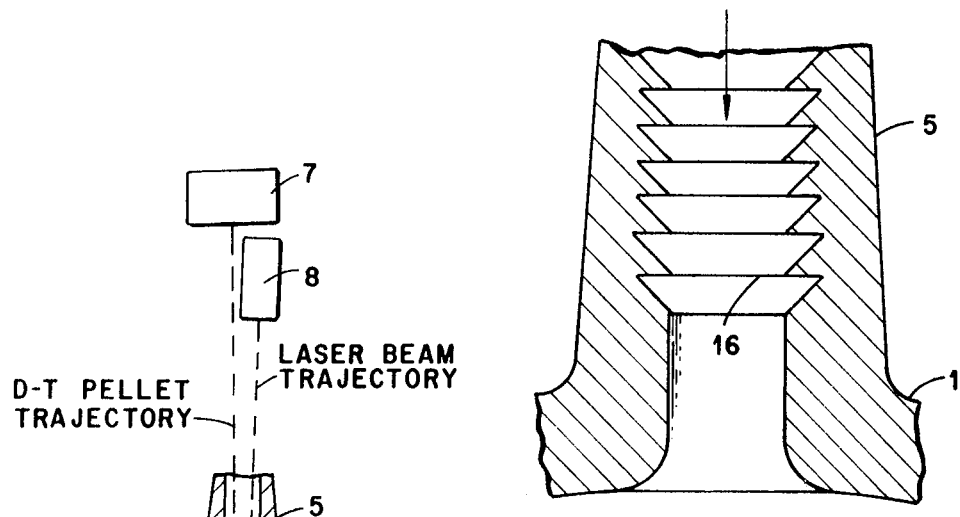
FIG. 4 is a drawing illustrating an injection nozzle designed to minimize transmission of a shock wave and/or lithium toward the pellet injector and laser beam source of the embodiments of FIGS. 1, 2, and 3.

It should be noted that the port 5 for pellet injection and the laser beam can be made quite long with a wall profile such as that shown in FIG. 4 to break the normal shock wave moving up through the port into a host of oblique shock waves and thus dissipate the bulk of its energy. The low density of the lithium vapor will make it possible to use quite long passages of the type shown in FIG. 4 without seriously slowing down the pellet as it is injected or losing a serious fraction of the laser beam energy to absorption in the gas-vapor mixture.

It should be noted that the above-mentioned flow rate of the heated liquid lithium of 1400 gallons per minute through the reactor will keep the average temperature rise in the lithium to about 100° F. during the operation of the reactor, which is desirable to keep the thermal stresses at a modest level.

As mentioned hereinabove, the heated liquid lithium with its inert gas bubbles circulating through the reactor serves not only as a cushion for the blast waves that are created as a result of the thermonuclear reactions that occur as each pellet is ignited, but also serves as a means for breeding tritium and for capturing the energy of the fast neutrons in the form of heat as a consequence of the slowing down and absorption of the neutrons, thus also minimizing any radiation damage to the reactor pressure vessel wall. In addition, since the thermonuclear reactions are essentially completely confined by the heated liquid lithium instead of metallic walls as is normally done in prior art reactors, there is no need for any magnetic fields for confining the reaction products since they are shielded by the flowing liquid lithium.

The overall tritium breeding ratio due to the $^6Li(n,\alpha)t$ reaction and the $^7Li(n,\alpha n')t$ reaction of the system of FIG. 1 will be of a value from 1.5 to 2.0. A system for recovering the tritium created in the liquid lithium 3 as it flows through the reactor of FIG. 1 is illustrated in FIG. 5 to which reference is now made.

In FIG. 5, the liquid lithium is continuously circulated between the blanket 3 and the heat exchanger 9, 9' in the same manner as described above for FIG. 1. If the tubes of the heat exchanger 9, 9' are fabricated from niobium, the tritium in the heated liquid lithium from the blanket 3 will readily diffuse through the walls of the niobium tubing, leaving the lithium in the tubing to be recirculated to the blanket 3.

The unit 9' also includes a potassium boiler to provide potassium vapor which mixes with the tritium, and then the mixture is fed to a potassium turbine 17 after which the mixture passes to a primary potassium condenser 18, which also serves as part of a steam boiler 18'. The units 18, 18' are in effect a heat-exchanger unit. Stainless steel was utilized for the tube material in the heat exchanger 18, 18' for the reason that stainless steel has a relatively low permeability to tritium diffusion, thus strongly inhibiting the loss of tritium to the steam system which includes a steam turbine 20 and a steam condenser 21.

The major portion of the condensed potassium from the unit 18 is passed back to the boiler 9' and begins a new cycle. To keep the loss of tritium to the steam system to a low level and at the same time to minimize the tritium inventories in the lithium and potassium systems, the condenser system for the potassium vapor was designed to give a flow pattern such that the tritium would be concentrated in the last portion of the potassium vapor to condense. This potassium vapor would be drawn off from the main, or primary, potassium condenser in much the same way as noncondensables are drawn off with an air ejector from a steam condenser, and would be carried to a secondary potassium condenser 19 operated at a temperature of 400° F. to reduce the partial pressure of the potassium to about 10 microns. The noncondensables would then be fed through an aspirator 22 to a palladium or niobium "window" 23, or "kidney" through which the tritium would diffuse. Rootes blower-type type vacuum pumps and a forepump, as represented by the unit 24, would then compress the tritium up to well above atmospheric pressure for storage in the unit 25.

It was thought at first that the rate of diffusion of tritium through the niobium casing to the vacuum region surrounding the reactor might be sufficiently high so that this would serve as the main channel for tritium recovery. It soon became evident that, while a portion of the tritium would indeed follow this path, the enormous difference in surface areas coupled with substantial differences in wall thickness would cause the bulk of the tritium to diffuse through the walls of the heat exchanger between the lithium and potassium circuits. However, roughly 1 percent would diffuse into the space between the niobium shell containing the lithium blanket region and the lead-water shield, not shown in FIG. 1. This space would be evacuated to protect the niobium from oxidation. In test work with niobium-encased lithium and potassium systems, the usual practice has been to surround the niobium system with a vacuum of at least $10^{-6}$ torr to protect the niobium, and this procedure was assumed for the design of FIG. 1. Tritium diffusing into this region would be drawn off by vacuum pumps, not shown, that would compress and deliver it to the main tritium stream drawn from the potassium condenser.

Inasmuch as inleakage of oxygen and/or water vapor to the evacuated regions might result in the formation of some HTO, it would also be necessary to remove moisture with aluminum oxide dryer equipment, not shown, to assure that the tritium content of the effluent gases discharged to the atmosphere would be well below tolerances.

It should be understood that the turbines 17 and 20 of FIG. 5 are coupled to conventional electrical generators, not shown, for producing electricity.

It should be noted that an intermediate potassium system is utilized in the tritium recovery and electrical generating system of FIG. 5 for the reason that such a system has a high thermodynamic thermal efficiency of at least 55 percent, and as a side benefit the thermal pollution to the atmosphere is reduced by a factor of two utilizing the system of FIG. 5. In addition, it should be understood that the means for recovering tritium is not limited to the system described hereinabove. For example, a distillation or any other suitable process may be utilized for this purpose.

Figure 2:
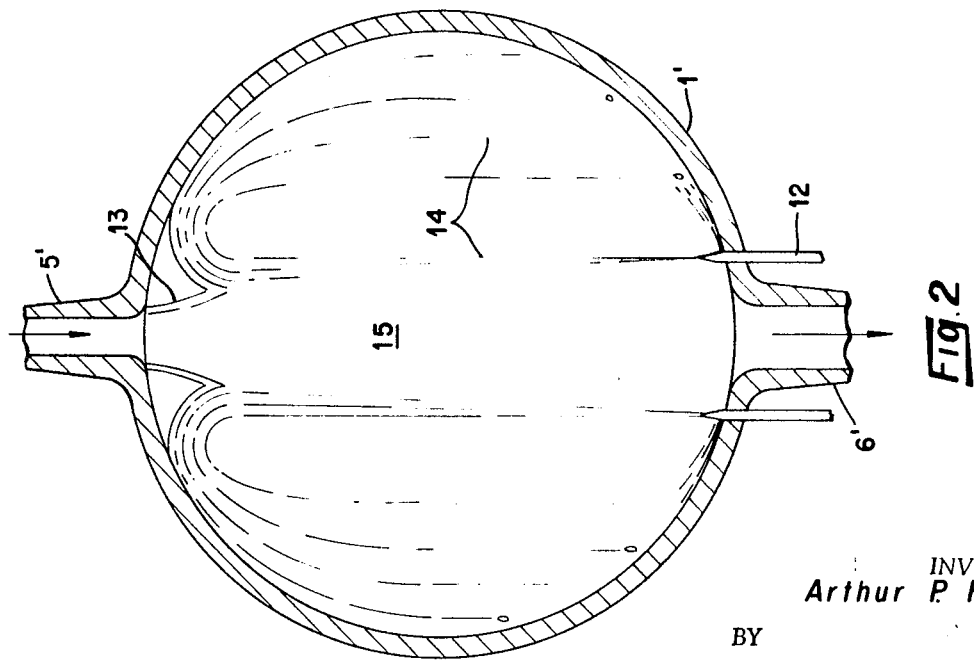
FIG. 2 is a drawing illustrating a second embodiment thereof.

Another embodiment of the reactor vessel is shown in FIG. 2. In this embodiment, the liquid lithium is injected through a plurality of jets 12, only two being shown, arranged concentrically about the outlet 6'. An internal diverter 13 near inlet 5' causes the lithium to be redirected to form the lithium wall 14 having a central hollow core 15 similar to the core of the aforementioned vortex 4 of FIG. 1.

The operation of the device of FIG. 2 is similar to that described for FIG. 1, with the plurality of jets 12 being connected to a pump and inert gas supply between a heat exchanger and the jets, and with the outlet 6' of the vessel 1' being connected to the high temperature side of the heat exchanger in the same manner as was done in FIG. 1.

Figure 3:
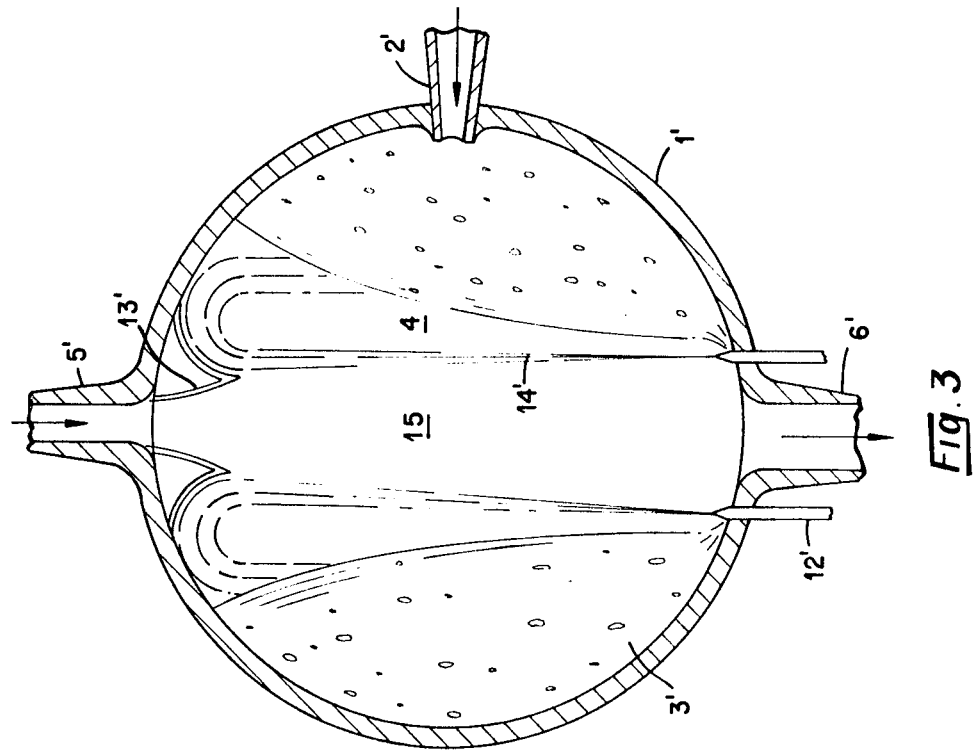
FIG. 3 is a drawing illustrating still another embodiment.

A further embodiment of the reactor vessel is illustrated in FIG. 3. In this embodiment, the vortex 4 is provided by flow of liquid lithium into the vessel 1' through a tangential inlet 2' and the central core 15 is provided by a plurality of jets 12' and the diverter 13' in the same manner as was done in FIG. 2 to form the lithium wall 14' encompassing the core 15.

The operation of the device of FIG. 3 would be similar to that of FIG. 1 with the pump delivering the liquid lithium to the reactor vessel by dividing its output flow in any desired proportionality between the inlet 2' and the jets 12'.

The invention described hereinabove has the advantage of not requiring any magnetic fields or magnet supplies for containing the reaction products such that the pressure vessel capital cost for such installations is only about $5–10/kw.(e), which is well below the dominant cost of the power plant and which is only a small fraction of the cost of conventional prior art reactors. Also, as pointed out above, the neutron economy of the reactor of the present invention is excellent in that a tritium breeding ratio of 1.5 to 2.0 can be routinely achieved. In addition to the production of heat for the economic conversion to electrical power, the reactor of the present invention would be useful in the propulsion systems of ships in that a considerable reduction both in nuclear safety problems and in pressure vessel size and weight could be achieved as compared with prior art systems for this purpose.

It should be understood that the present invention is not limited to the use of frozen deuterium-tritium pellets therewith, but it can also be practiced with the use of frozen deuterium pellets or with the use of frozen D–$^3$He pellets, if desired.

It should also be understood that the above-described invention is not limited to the use of liquid lithium per se, but may also be practiced with the use of a liquid lithium-beryllium fluoride compound or other lithium-containing compounds.

This invention has been described by way of illustration rather than limitation, and it should be apparent that it is equally applicable in fields other than those described.

What is claimed is:

1. An improved thermonuclear reactor system comprising a pressure vessel provided with at least one inlet for feeding heated liquid lithium thereinto to form a lithium wall surrounding a centrally disposed void area, a top inlet and a bottom lithium outlet provided in said vessel and being coaxially aligned with the axis of said void area, a heat exchanger and a tritium recovery and electrical generating system associated therewith, a pump, said pump being connected between one side of said heat exchanger and said inlet of said pressure vessel, said bottom lithium outlet connected to the other side of said heat exchanger, a source of frozen thermonuclear fuel pellets, means for injecting said pellets singly through said top inlet into said void area at selected intervals of from 1 to 30 seconds, a pulsed laser system, means for periodically energizing said laser system to produce a pulsed laser beam of a selected energy and time duration and directing said pulsed laser beam through said top inlet into the path of each of said pellets within the lower portion of said void area during each of said intervals to sequentially initiate fusion reactions in each of said injected pellets, said heated liquid lithium within said pressure vessel encompassing said void area serving as a tritium breeding blanket for breeding tritium by the fast neutrons resulting from the fusion reactions of said pellets, and serving as a means for absorbing the periodic blast waves created by said fusion reactions.

2. The reactor system set forth in claim 1, wherein said frozen pellets comprise deuterium-tritium, said system further including a source of inert gas connected to said pump for supplying gas bubbles to said liquid lithium being pumped into said pressure vessel.

3. The reactor system set forth in claim 2, wherein said top inlet to said pressure vessel is provided with a plurality of internal energy attenuating baffles to reduce the force of said blast waves in a direction toward said fuel pellet injecting system and said laser beam system, and said lithium feeding inlet is positioned in the side of said pressure vessel for feeding said lithium tangentially thereinto.

4. The reactor system set forth in claim 3, wherein said pulsed laser beam has an energy of a selected value from $2\times10^3$ to $10^7$ Joules, with a duration of less than $10^{-9}$ second, and said frozen pellets have a diameter of about 0.10 inch.

5. The reactor system set forth in claim 4, wherein said liquid lithium is circulated through said reactor pressure vessel at a rate of 1400 gallons per minute, and the resultant energy release into said blanket from said fusion reactions is of a value from $10^4$ to $10^9$ Joules per pulse depending upon the size of the pellet and the input energy of said laser beam pulse.

6. The reactor system set forth in claim 3, wherein a plurality of upwardly directed jets arranged concentrically about said bottom lithium outlet are substituted for said side inlet with said pump being connected to said jets, and an internal hollow diverter mounted within said pressure vessel adjacent to the opening of said top inlet, whereby said liquid lithium injected into said pressure vessel through said jets is diverted by said diverter to form said centrally disposed void area.

7. The reactor system set forth in claim 3, wherein a plurality of upwardly directed jets are arranged concentrically about said bottom outlet, said jets also being connected to said pump such that said liquid lithium is pumped from said heat exchanger into said pressure vessel by way of said side inlet and said jets, and a flow diverter mounted within said pressure vessel for diverting the flow through said jets away from said void area.

8. The reactor system set forth in claim 3, wherein said tritium recovery and electrical generating system includes providing said heat exchanger with niobium tubing such that the tritium formed in said liquid lithium while it is in said pressure vessel is removed in said heat exchanger by diffusing through said niobium tubing, said tritium recovery and electrical generating system further including a potassium boiler associated with said heat exchanger, a potassium turbine coupled to said potassium boiler, a first potassium condenser coupled between said potassium boiler and turbine, a steam boiler, a steam turbine coupled to said steam boiler, a steam condenser coupled between said steam turbine and said steam boiler, said first potassium condenser and said steam boiler functioning as a second heat exchanger which is provided with alloy steel tubing, a second potassium condenser coupled to said first potassium condenser, a tritium window, an aspirator coupled between said window and said second potassium condenser, a tritium storage unit, and tritium pumps coupled between said storage unit and said window, whereby said potassium boiler provides a potassium vapor which is mixed with said tritium which has diffused through said niobium tubing in said first heat exchanger and said mixture drives said potassium turbine, said tritium being adapted to flow as a noncondensable from said first condenser to said second condenser and finally to said window through said aspirator, and said potassium turbine and said steam turbine both being adapted to drive electrical generators for producing electricity.

9. A method of operating a thermonuclear reactor comprising the steps of feeding heated liquid lithium tangentially into a pressure vessel from a heat exchanger and then feeding said lithium from said vessel back to said heat exchanger such that a centrally disposed void area is formed in said pressure vessel, periodically injecting frozen thermonuclear fuel pellets singly into said void area, directing an intense pulsed laser beam of a selected energy and time duration into said void area into the path of each of said injected pellets for igniting each of said pellets thereby effecting a series of thermonuclear reactions in said void area, breeding tritium in said liquid lithium within said pressure vessel by the fast neutrons created by said reactions, removing said tritium in said heat exchanger, and utilizing the heat removed in said heat exchanger to drive a steam turbine for producing electricity.

10. The method set forth in claim 9, and further including the step of injecting inert gas bubbles into said liquid lithium before it is fed into said pressure vessel.

* * * * *